United States Patent [19]

Bremer et al.

[11] Patent Number: 4,924,516
[45] Date of Patent: May 8, 1990

[54] METHOD AND SYSTEM FOR A SYNCHRONIZED PSEUDO-RANDOM PRIVACY MODEM

[75] Inventors: Gordon Bremer, Clearwater; William L. Betts, St. Petersburg, both of Fla.

[73] Assignee: AT&T Paradyne, Largo, Fla.

[21] Appl. No.: 356,080

[22] Filed: May 23, 1989

[51] Int. Cl.⁵ .............................................. H04L 9/22
[52] U.S. Cl. ......................................... 380/46; 380/9; 380/48
[58] Field of Search .............................. 380/9, 48, 46

[56] References Cited

U.S. PATENT DOCUMENTS 4,752,953 7/1988 Paik et al. .................................. 380/9
4,837,821 6/1989 Kage ........................................ 380/48

Primary Examiner—Salvatore Cangialosi
Attorney, Agent, or Firm—Kane, Dalsimer, Sullivan, Kurucz, Levy, Eisele & Richard

[57] ABSTRACT

A method and system for a synchronized pseudorandom privacy modem makes use of a pseudorandom signal generator to index into a table of N signal spaces thereby altering gain and phase modifiers so or to modify both the gain and phase of portions of the data signal being transmitted from a QAM modem and thus transmit an encrypted signal pattern to the other end of the communications channel. The modem transmitter circuit includes a data scrambler, and QAM signal point mapper, connected in series, as well as a pair of mixers having inputs from the pseudorandom signal generator and functioning to modify the gain and phase of portions of the QAM signal point mapper output signal before they are pulse amplitude modulated, filtered, converted to analog form, and transmitted over the communications channel. Complementary circuit elements in the receiver, which have been synchronized with those of the transmitter by baud rate counters at both locations, demodulate and decode the received encrypted signal.

9 Claims, 2 Drawing Sheets

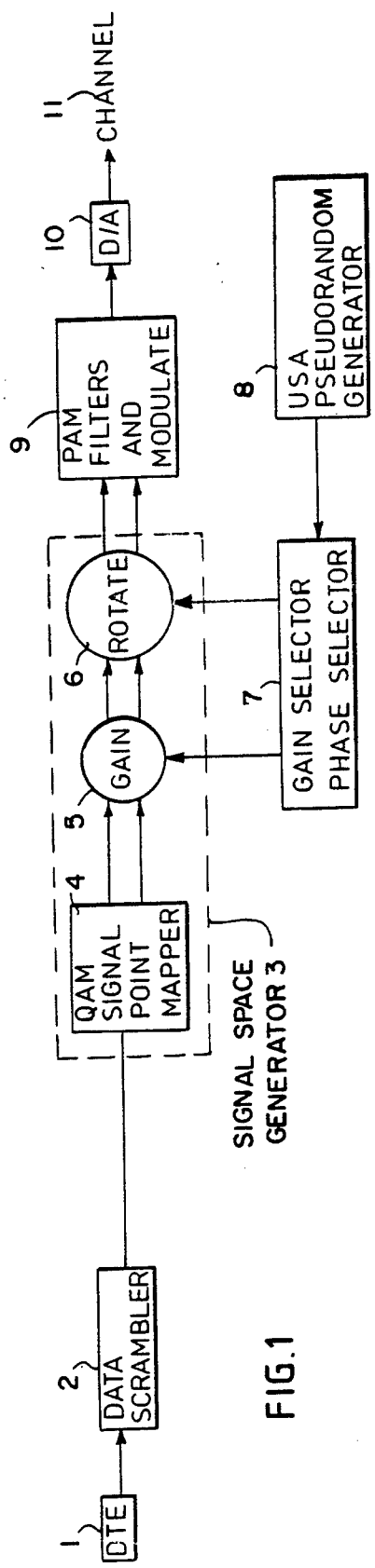
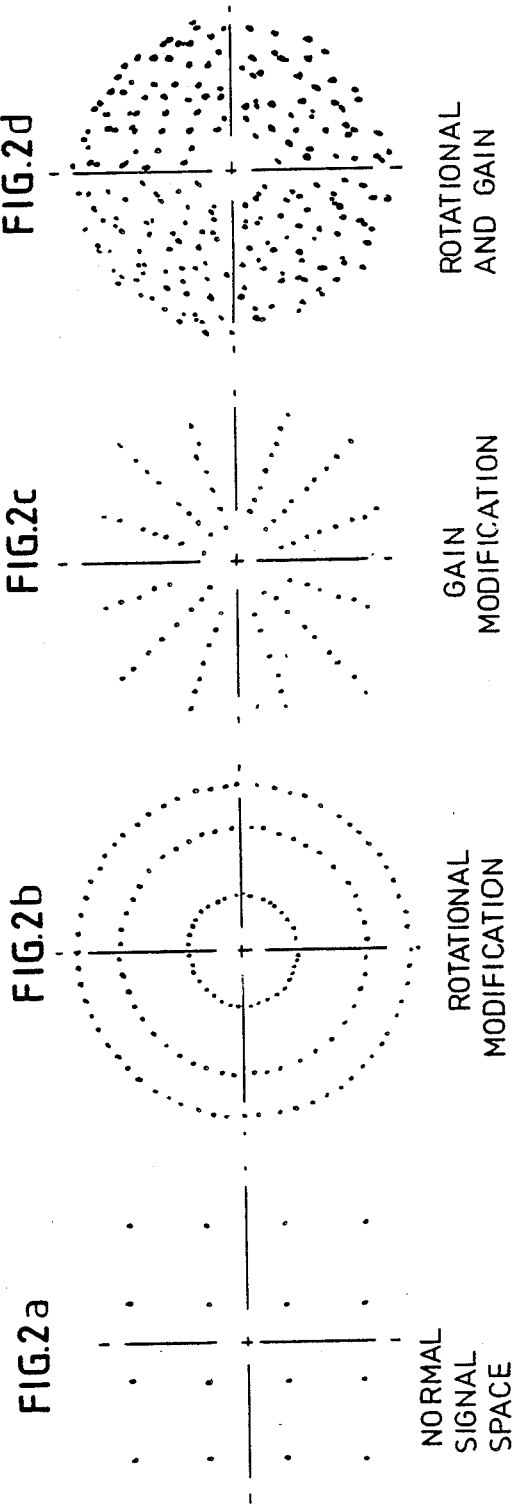

METHOD AND SYSTEM FOR A SYNCHRONIZED PSEUDO-RANDOM PRIVACY MODEM

BACKGROUND OF THE INVENTION

1. Field Of The Invention

The present invention relates to a method for pseudorandomly manipulating data prior to its analog transmission over a communications channel such as a telephone line so as to provide secure communications between the ends of the communications channel.

2. Description Of The Prior Art

In general, modems have fixed modulation and data handling methods so that every modem of a given type can communicate with all others of that type. When encryption has been needed to protect the privacy of communications, the prior art has generally accomplished the encryption by providing circuit functions implemented by hardware and software which is separate from the modem function.

Some "privacy" modems exist in the prior art, but it is doubtful if any contain powerful, pseudorandom, self-synchronizing modulation modifiers such as are presented herein.

OBJECTIVES AND SUMMARY OF THE INVENTION

It is an object of the invention to provide pseudorandom time varying changes to some of the several fixed transmit functions of a typical modem so as to manipulate the data prior to analog transmission and to make data reception difficult or impossible unless the identical, synchronized, complementary changes are provided in the receiver.

it is further object of this invention to identify functions which can be time varied, provide a method for time varying, and provide methods for synchronizing these changes.

These and other objects and advantages of the invention will be made clear by the following description. The method of the present invention comprises passing a digital data input signal through conventional modem elements comprising a data scrambler, and quadrature amplitude modulation (QAM) signal point mapper. At this point, in an ordinary modem, the outputs from the QAM signal point mapper would be conveyed to pulse amplitude modulation (PAM) filters, the outputs of which would modulate quadrature carriers which would then be combined to produce a QAM signal and then transmitted in analog form on the communications channel. However, in the method of the present invention, the signal from the QAM signal point mapper is encrypted by having various portions of the signal changed pseudorandomly in gain and/or phase by at least one USA (Unobtrusive Signature Analysis) pseudorandom generator operating through a gain selector and phase selector module. The receiver at the other end of the communications channel must, of course, be equipped to perform changes on the received signal which are complementary to those produced by the USA pseudorandom generator(s) in order to correctly decode the encrypted data signal. The effect of the invention is to pseudorandomly select a QAM signal space for each data symbol from a limited set of signal spaces.

BRIEF DESCRIPTION OF THE DRAWINGS

FIG. 1 is a schematic of the transmitter circuit used to facilitate the method of the present invention.

FIG. 2a shows a conventional signal space for a nonencrypted data signal.

FIG. 2b shows a data signal which has undergone rotational modification by having pseudorandom changes applied to the phase of various signal points.

FIG. 2c shows a signal space in which various signal points have been pseudorandomly modified by adjustments in their gain.

FIG. 2d shows a signal which has been modified by pseudorandom changes in both the gain and phase characteristics of at least some of its signal points.

DETAILED DESCRIPTION OF THE INVENTION

Figure 3:
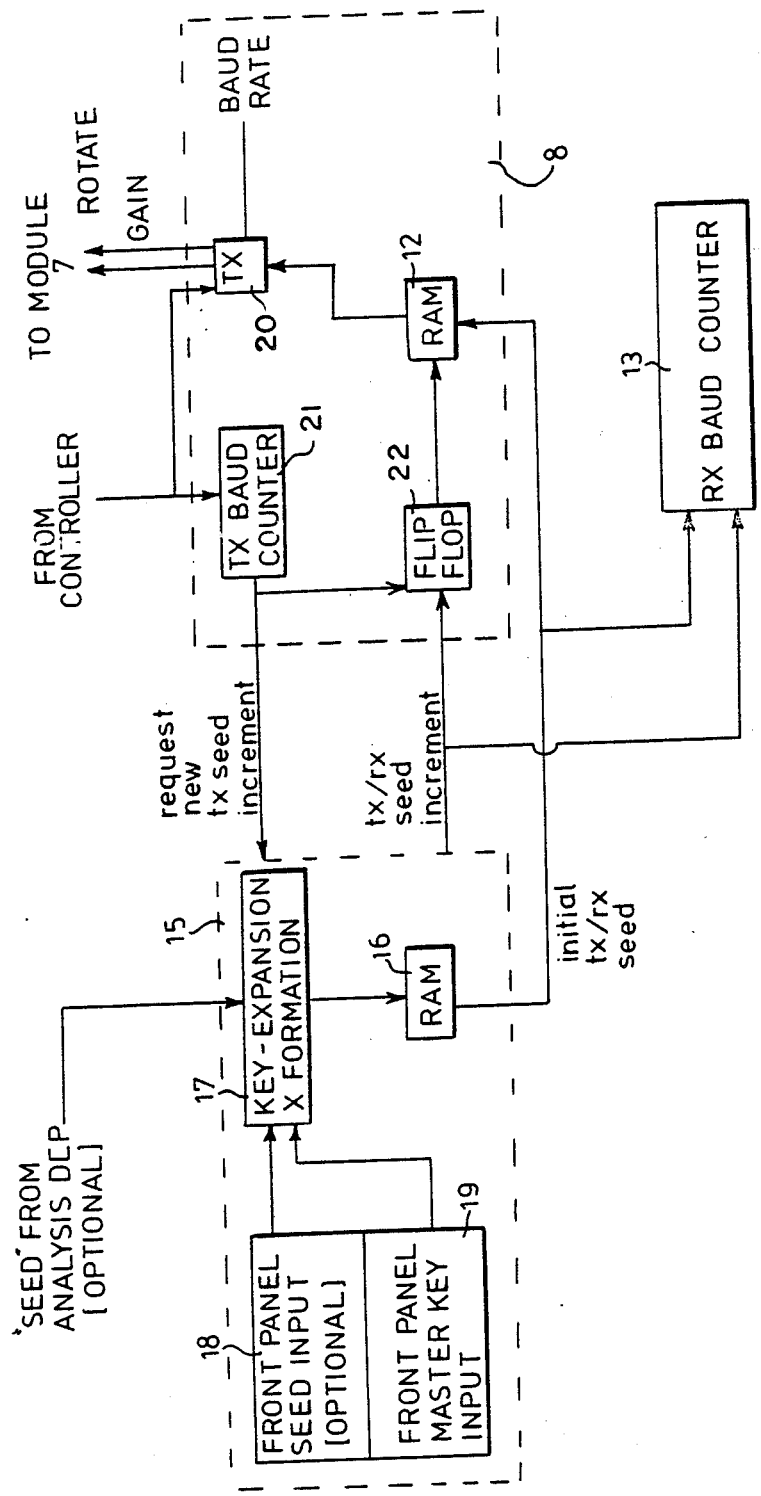
FIG. 3 is a schematic showing details of the pseudorandom generator of FIG. 1.

FIG. 1 shows a data input from a source such as a DTE (Data Terminal Equipment) to data scrambler 2. The output of data scrambler 2 is connected to the input of quadrature amplitude modulated signal space generator 3. Signal space generator 3 includes a QAM signal point mapper 4, a gain modifier 5 and a phase modifier 6. The gain modifier 5 and the phase modifier 6 are responsive to the outputs of gain selector/phase selector 7. Gain selector/phase selector 7 includes table in memory of N gains and N phases, each corresponding to one of N possible signal spaces. USA Pseudorandom Generator 8 generates pseudorandom number between 1 and N each symbol time. These pseudorandom numbers are transmitter to gain selector/phase selector 7 which was the pseudorandom numbers as an index into the table in memory of N signal spaces so as to generate the outputs of selector 7. After the signal has been encrypted by modifiers 5 and 6, the signal is conveyed to module 9 wherein it is pulse modulated, filtered and modulated by quadrature carriers. Finally, the signal is changed to analog form by converter 10 and is conveyed to communications channel 11 for transmission to a receiver having complementary demodulation modifiers to decode the encrypted signal.

A typical modem, which would include all of the elements of FIG. 1 except elements 5, 6, 7 and 8, has several fixed transmit functions which manipulate data prior to analog transmission. Complementary fixed receiver functions are provided to convert this analog transmission into the original (error-free) digital data. However, in the present invention, by using USA generator 8 to provide pseudorandom time varying changes to some of the above transmit functions, it is possible to make data reception difficult or impossible unless the identical, synchronized complementary changes are provided in the receiver.

It is the intent of this invention to identify functions which can be time varied, to provide a method for time varying these functions, and to provide methods for synchronizing the time varying changes. The method of the present invention also functions to identify the selected fixed function modifiers.

The privacy modem of the present invention will accept a privacy key consisting of P-bits where P is long enough to discourage eavesdropping events by trial and error method. A value of P=56 is used because this is the length of the DES (Data Encryption Standard) key. The bits of the privacy key will reside in a signal processor memory and groups of these bits will be utilized to determine various fixed and time varying signal processing modifier functions.

Further enhancement of the security of the method of the present invention can be obtained by using two privacy keys, one for each direction of communication of the channel.

Certain bits of the privacy key can be used to select fixed parameter modifiers. These include, but are not limited to the following transmit functions. The complementary receive functions are also selected by bits from the privacy key. The following are fixed parameter modifiers:

1. Scrambler
   a. Self-sync or non-self-sync
   b. Register Length
   c. Configuration
   d. Bits scrambled
   e. Speed
   f. Starting vector
   g. Multiple scrambling at different rates
2. Bit to signal space assignment mapper In addition to the above mentioned fixed parameter modifiers, the method of the present invention contemplates a much more sophisticated security configuration which is provided by including time varying modifiers. The time varying modification can affect the fixed parameters above. However, it creates a much more secure system by providing pseudorandom signal space rotation and amplitude changes. This method is feasible due to the "Unobtrusive Signature For Modulated Signals" method invented by Betts and Martinez and described in U.S. patent application Ser. No. 083,696 which was filed on Aug. 7, 1987.

The use of combinations of the above mentioned modifier techniques makes it not only possible to provide tandem nonlinear digital encryption, but also prevents improperly keyed modem receiver demodulation by causing the receiver to totally interrupt data during attempts to coordinate the transmitter and receiver (receiver retraining).

The pseudorandom generator 8 shown in FIG. 1 makes use of unobtrusive signature analysis (USA) to establish an arbitrarily long transmitter/receiver synchronization pseudorandom sequence. Loss of this synchronization totally destroys the ability of the receiver to demodulate data. Thus, if the receiver is not properly keyed, the receiver will present totally encrypted and interrupted data as well as interrupted control signalling.

The USA generator 8 of FIG. 1 is used to make random phase changes of the signal space up to ±180°. These changes are quantized by an amount such that invalid signal points are received for a phase change other than 0°. The USA generator is also used to make random gain changes.

FIG. 2a shows a "normal" signal pattern which might be generated by a conventional modem having all of the elements of FIG. 1 except elements 5, 6, 7 and 8.

FIG. 2b shows a signal pattern which has been operated on by USA to the random generator 8 through the phase selector of gain selector and phase module 7 to rotate a conventional signal pattern in mixer 6.

FIG. 2c shows a signal pattern wherein pseudorandom generator 8 has applied modification to the gain of a various points of a conventional signal pattern through the gain selector portion of module 7 and mixer 5.

FIG. 2d shows a signal pattern which at least some points of a conventional signal pattern have been varied in both gain and phase due to signals generated by signals emitted from generator 8 and conveyed through gain selector and phase selector module 7 to the respective mixers 5 and 6.

The pseudorandom pattern generator 8 disclosed in FIG. 1 is implemented for the purpose of time varying certain modulation and demodulation parameters. The characteristics of the pseudorandom pattern generator 8 are determined by a T-bits word ("SEED") which is programmed into a random access memory (RAM) in generator 8. Generator 8 runs at the modem baud rate or faster to vary the modulation parameters, the pattern being the function of the aforementioned "SEED" word. A Controller loads the "SEED" word into the RAM in the USA generator 8. The Controller can self-generate a new "SEED" or increment the previous "SEED" to vary the pattern (to be non-user interruptive, these changes need to be synchronized at the end of the communication link).

A fundamental requirement for the method and system of the present invention is the establishment of an absolute timing synchronization between the transmitter and the remote receiver. This is established using the unobtrusive signature method mentioned with regard to the aforementioned U.S. application Ser. No. 083,696, which is extended to long elaborate pseudorandom patterns.

At the end of the transmit training sequence, the generator 8 and associated baud counter are started. The remote receiver of the system, upon detecting the end of receiver training, starts its complementary pseudorandom generator and baud counter. Thus, both the transmitter and the receiver then have identical pseudorandom generating signals and baud counts available. Loss of synchronization and/or baud count will cause a loss of receiver demodulation and institute a round robin retraining sequence which will reestablish synchronization.

The pseudorandom generator 8 may be a feedback shift register, multiple register, or a counter. In any of these embodiments, the configuration and starting patterns are function of the aforementioned "SEED" word. "SEED" needs to have a minimum of 24 bits. As stated previously, the output of generator 8 is used to rotate the transmitter signal space. The choice of rotation may be binary or multiphased. This rotation can be viewed as pseudorandom selection of two possible signal cases (the binary case) or many possible signal phases (the multiphase case) or many possible signal phases (the multiphase case). The degree of rotation needs to be large enough to cause bit "errors" in the receiver as well as marginal decision region "errors" to assure scrambled receiver data for each baud.

In the method of the present invention the baud counter will output a periodic pulse to request a new "SEED". The Controller will use this as a notification to either (1) send a binary information bit back to the generator 8 or (2) send a whole new "SEED" to the generator 8. At the next "SEED" request the USA will increment its internal "SEED" word. Since the baud counters are synchronized at the transmitter and remote receiver, no loss of user data will occur.

FIG. 3 shows details of an implementation of the above mentioned function including details of pseudorandom generator 8 wherein it is shown that the generator comprises a transmit module 20 which outputs gain and rotate signals to the rest of the modem circuitry, a transmitter baud counter 21 which is synchronized with the transmitter module 20 at the end of the training period, and a D-Q flip-flop 22 connected to an output of the baud counter and having a periodic output to random access memory 12 which stores a "SEED" word for transmission to the transmitter module 20 at the next pulse from baud counter 21.

Also shown in FIG. 3 is the receiver baud counter 13 which is synchronized with both the initial transmitter/receiver "SEED" word and with "SEED" increments.

FIG. 3 also shows a Controller 15 having a memory module 16 which stores a "SEED" word therein for transmission to generator 8. Memory module 16 may have an input from a key expansion and transmitter formation module 17 which itself has an optional input of a "SEED" from a Controller or from a front panel module 18. Also on the front panel is a master key input which can be conducted to another terminal of module 17. The DCP 15 transmits an initial transmitter/receiver seed signal to the RAM 12 in generator 8 and also transmits subsequent transmitter/receiver SEED increment as signals to flip-flop 22.

Although several preferred embodiments have been disclosed and described in detail herein, it should be understood that this invention is in no sense limited thereby and its scope is to be determined by that of the appended claims.

What is claimed is:

1. A method for a synchronized pseudorandom privacy modem comprising the steps of:
   storing a table with parameters corresponding to N signal spaces;
   generating a string of pseudorandom numbers;
   indexing into said table with said string of pseudorandom numbers thereby generating a string of parameters corresponding to said N signal spaces;
   quadrature amplitude modulating a digital signal;
   altering the quadrature amplitude modulated digital signal responsive to said string of parameters corresponding to said N signal spaces;
   converting the altered quadrature amplitude modulated digital signal to an analog signal; and
   transmitting the analog signal over a communication channel.

2. The method of claim 1 wherein said altering step includes altering a gain of the quadrature amplitude modulated digital signal.

3. The method of claim 1 wherein said altering step includes altering a phase of the quadrature amplitude modulated digital signal.

4. The method of claim 1 wherein said altering step includes altering a gain and a phase of the quadrature amplitude modulated digital signal.

5. A system for providing secure data transmission over a communication channel comprising:
   means for storing a table of parameters corresponding to N signal spaces;
   means for generating a string of pseudorandom numbers;
   means for indexing into said table with said string of pseudorandom numbers thereby generating a string of parameters corresponding to said N signal;
   means for quadrature amplitude modulating a digital signal;
   means for altering the quadrature amplitude modulated digital signal responsive to said string of parameters corresponding to said N signal spaces;
   means for converting the altered quadrature amplitude modulated digital signal to an analog signal; and
   means for transmitting the analog signal over a communications channel.

6. The system of claim 5 further comprising a data scrambler having at least one input to said quadrature amplitude modulating means.

7. The system of claim 5 further comprising a phase selector module connected to an output of said pseudorandom generating, means and a first mixer connected to an output of said phase selector module and to an output of said quadrature amplitude modulating means.

8. The system of claim 6 further comprising a gain selector in said phase selector module which has an input from said pseudorandom generating, means and further comprising a second mixer connected to an output of said gain selector and to said output of said quadrature amplitude modulating means.

9. The system of claim 7 further comprising a pulse amplitude modulating and filtering module connected to outputs of said first mixer, and a digital to analog converter connected to an output of said pulse amplitude modulating and filtering module and to said communications channel.

* * * * *